United States Patent [19]
Doerksen

[11] Patent Number: 5,789,714
[45] Date of Patent: Aug. 4, 1998

[54] METHOD AND APPARATUS FOR WEIGHING A LOAD

[75] Inventor: James L. Doerksen, Marlow, Okla.

[73] Assignee: Adrian J. Paul Co., Inc., Duncan, Okla.

[21] Appl. No.: 608,471

[22] Filed: Feb. 28, 1996

[51] Int. Cl.$^6$ .......................... G01G 19/10; G01G 19/02; G01L 1/00

[52] U.S. Cl. .......................... 177/141; 177/208; 177/146; 73/862.542

[58] Field of Search .................... 177/141, 208, 177/209, 254, 136, 137, 138, 139, 146; 73/862.542

[56] References Cited

U.S. PATENT DOCUMENTS

| | | | |
|---|---|---|---|
| Re. 27,234 | 11/1971 | Smieja | 177/146 |
| 2,736,549 | 2/1956 | Paul | 265/55 |
| 2,756,983 | 7/1956 | Furcini | 177/141 |
| 3,306,384 | 2/1967 | Ross | 177/141 |
| 3,338,323 | 8/1967 | Swersey | 177/141 |
| 3,587,760 | 6/1971 | Puhringer et al. | 177/141 |
| 3,724,571 | 4/1973 | Thorn et al. | 177/141 |
| 3,765,497 | 10/1973 | Thordarson | 177/208 |
| 4,058,178 | 11/1977 | Shinohara et al. | 177/146 |
| 4,137,977 | 2/1979 | Alger | 177/254 X |
| 4,589,507 | 5/1986 | Curran | 177/138 |
| 4,606,419 | 8/1986 | Perini | 177/138 |
| 4,777,831 | 10/1988 | Masuda | 73/862.542 |
| 4,836,304 | 6/1989 | Paul | 177/185 |
| 5,065,828 | 11/1991 | Smith | 177/139 |
| 5,178,226 | 1/1993 | Bowman et al. | 177/139 |
| 5,205,370 | 4/1993 | Paul et al. | 177/256 |
| 5,230,394 | 7/1993 | Blanc | 177/145 |
| 5,230,395 | 7/1993 | Paul et al. | 177/258 |
| 5,258,583 | 11/1993 | Paul et al. | 177/259 |
| 5,285,020 | 2/1994 | Jurca | 177/139 |
| 5,308,935 | 5/1994 | Paul et al. | 177/256 |
| 5,369,222 | 11/1994 | Strelioff | 177/136 |
| 5,375,560 | 12/1994 | Paul et al. | 119/734 |
| 5,384,437 | 1/1995 | Paul et al. | 177/256 |
| 5,384,438 | 1/1995 | Paul | 177/256 |
| 5,393,936 | 2/1995 | Tyhy et al. | 177/138 |
| 5,578,798 | 11/1996 | Nuyts | 177/136 |

FOREIGN PATENT DOCUMENTS

| | | |
|---|---|---|
| 430393 A1 | 6/1991 | European Pat. Off. |
| 476778 A2 | 3/1992 | European Pat. Off. |
| 476778 A3 | 3/1992 | European Pat. Off. |
| 2159623 | 5/1973 | France |
| 822020 | 11/1951 | Germany |
| 4140344A1 | 6/1993 | Germany |
| WO8908568 | 9/1989 | WIPO |

OTHER PUBLICATIONS

Load Cells Force Sensors Torque Sensors, Mar. 1994, 4 pages.
CC-20 Weigh Block Compression Load Cell, Aug. 1995, 1 page.
Paul Sure-Weigh Scales Roll-Off Scales, Sep. 26, 1995, page 1.
Machine Design p. 92 Getting a Read on Strain, Oct. 26, 1995, page 1.

*Primary Examiner*—Michael L. Gellner
*Assistant Examiner*—Randy W. Gibson
*Attorney, Agent, or Firm*—Thomas R. Weaver

[57] ABSTRACT

This invention provides an apparatus and a method of using the apparatus to determine the weight of a load which is supported on a frame. In a preferred use of the invention, the load is supported on a tilt frame which is itself supported on the chassis of a transport means, such as truck.

The apparatus of this invention comprises a combination of a hydraulic system for lifting the load and a load sensor for sensing the weight of the load lifted, wherein the full weight of the load to be weighed is simultaneously transferred to the load sensor as the hydraulic system lifts the load, while the entire load continues to be carried by the frame.

The invention still further comprises electronic means for converting the sensed weight to digital terms and means for mathematically manipulating, storing, and displaying the sensed weight for immediate and subsequent purposes.

10 Claims, 12 Drawing Sheets

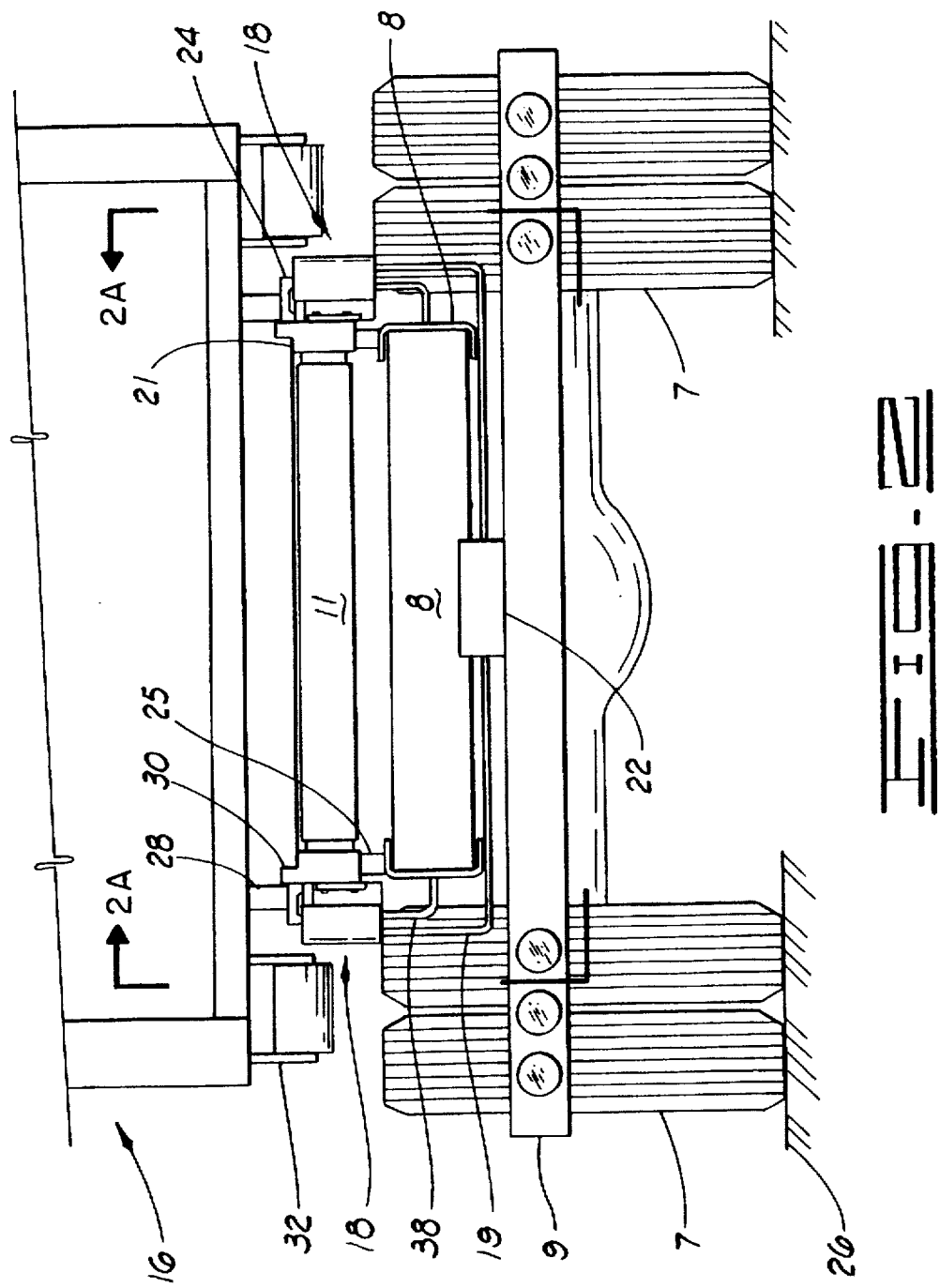

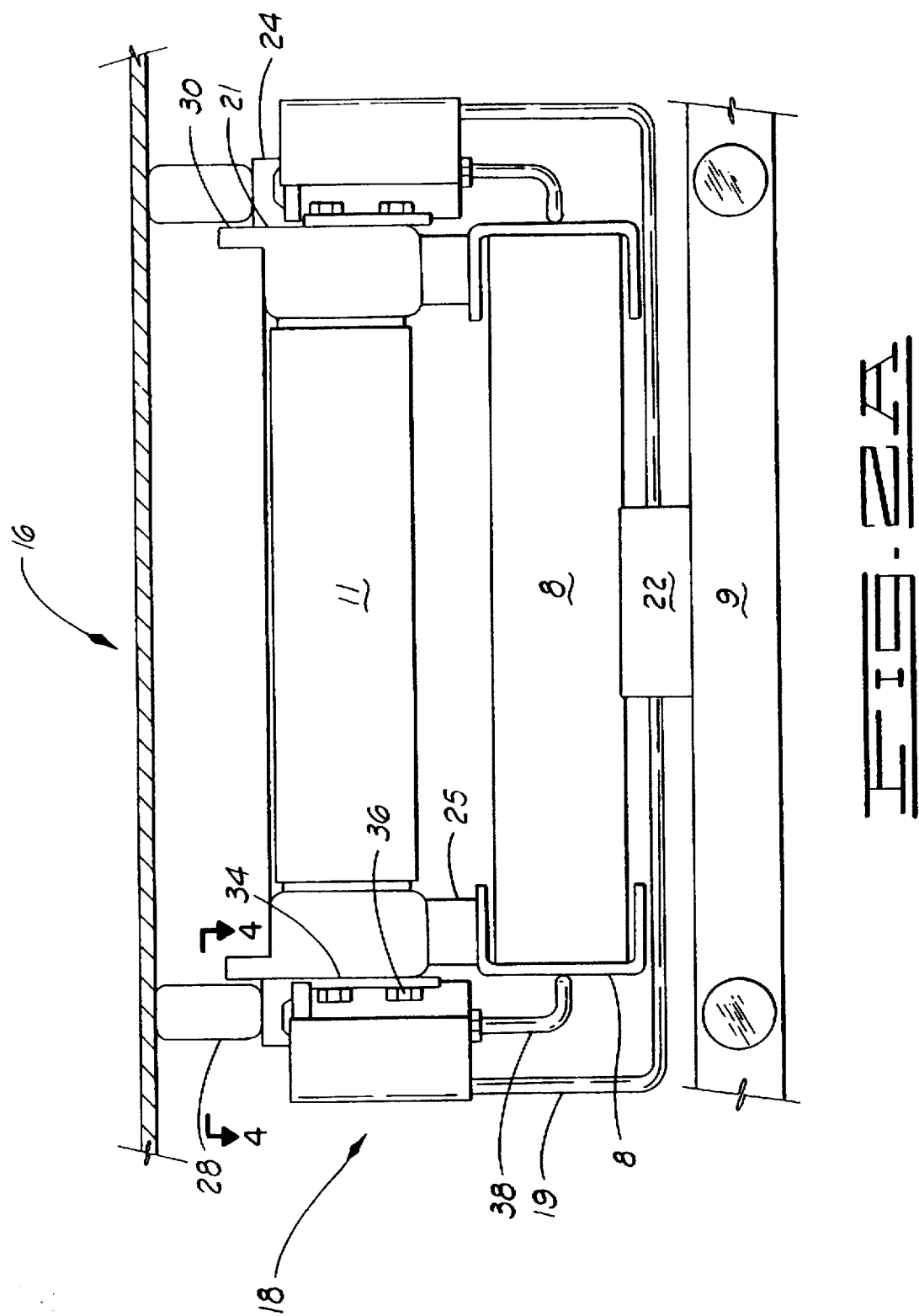

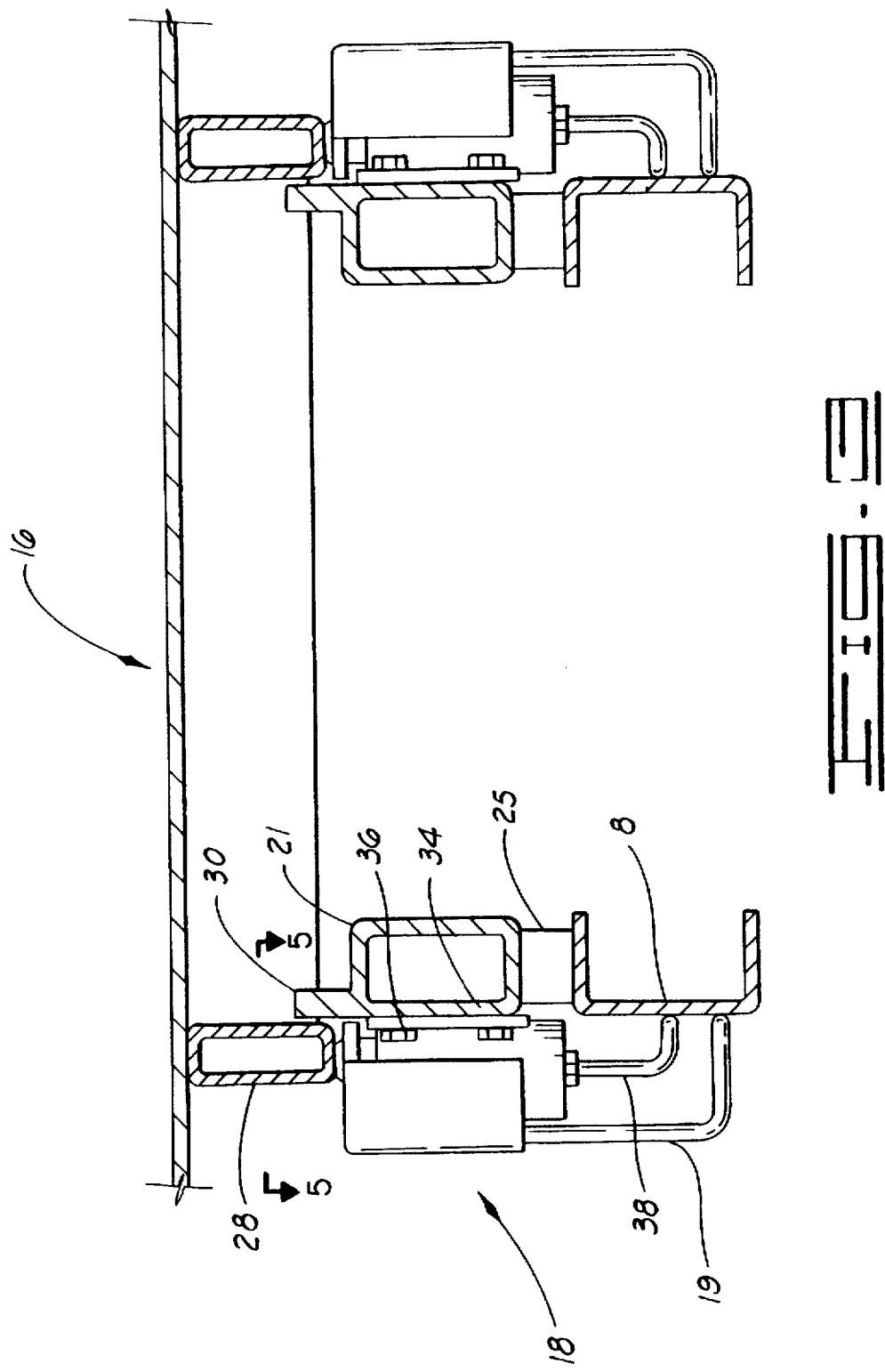

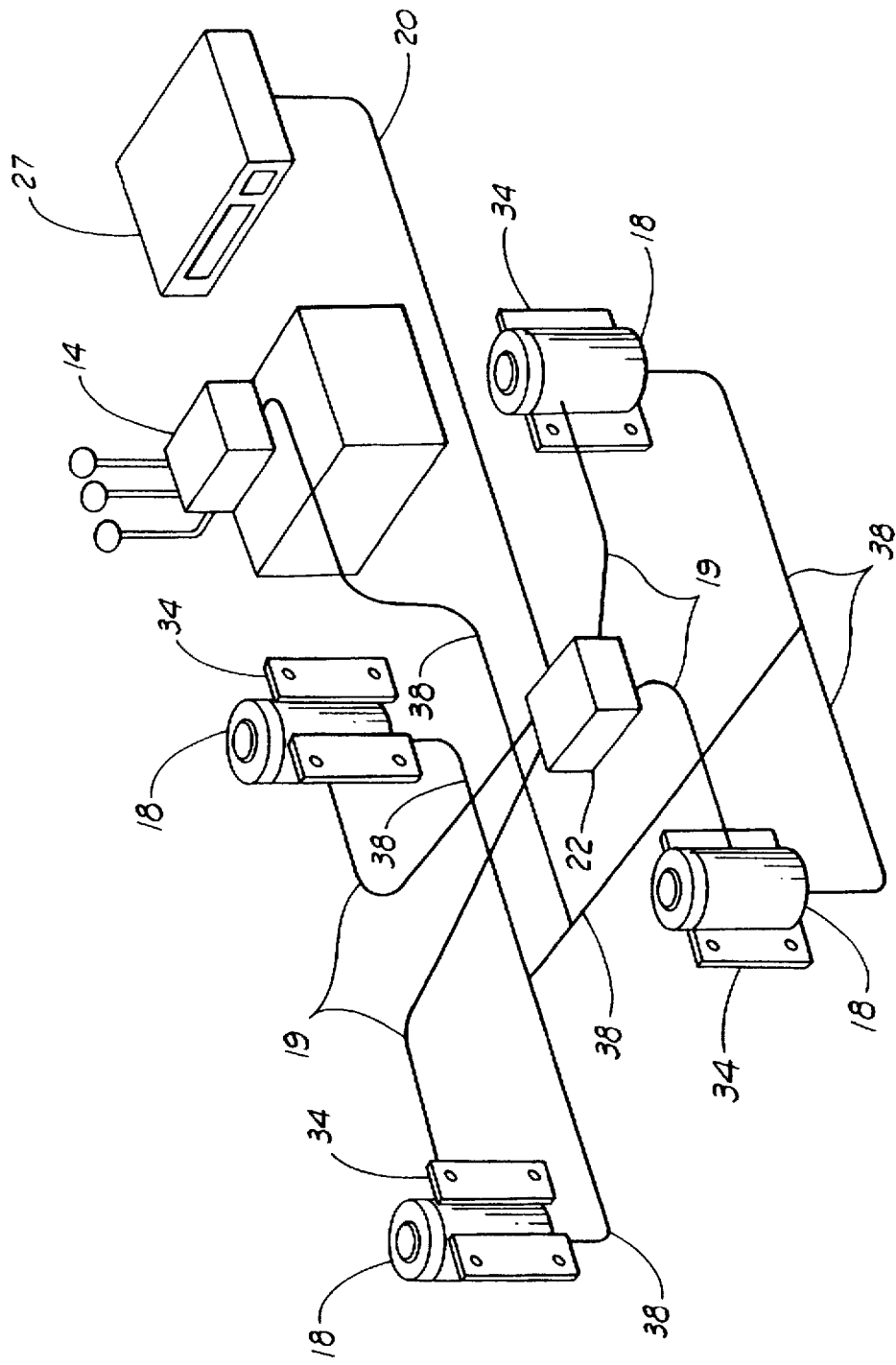

METHOD AND APPARATUS FOR WEIGHING A LOAD

BACKGROUND OF THE INVENTION

1. Technical Field of the Invention

This invention broadly relates to the determination of the weight of a quantity of material. It further relates to the determination of the bulk weight of a quantity of material which is supported on frame. The invention further, and more specifically, relates to an apparatus for determining the weight of an object and a method of employing the apparatus to determine the bulk weight of a quantity of material which is supported on a vehicle frame, such as a truck frame.

2. Description of the Prior Art and Problems Solved

It is a well known and common practice to employ wheeled vehicles, such as trucks, to support and transport loads and/or bulky items from one specific place to another specific place with relative ease and flexibility. Some such vehicles employed to conduct the support and transport function have containers fixed to the chassis frame of the vehicle to hold the load to be supported and transported. Such vehicles are, accordingly, dedicated to a single container. Thus, while the load is placed in the container the vehicle must be present at the loading site and while the load is removed from the container the vehicle must be present at the unloading site.

The art recognized the "fixed" container requirement as a limitation on the flexibility of the primary purpose of the vehicle to support and transport loads. To solve this limitation, the art developed a truck having a frame placed intermediate the container and the chassis. The intermediate frame is connected to the rear of the chassis by a pin and pivot and to the forward end thereof by a hydraulic lift. Accordingly, upon actuation of the hydraulic lift, the intermediate frame rotates about the pivot and tilts upwardly by an amount sufficient to enable the rear portion of the thus tilted frame to contact or at least to come within close proximity to the ground. Such intermediate frames are referred to in the art as "tilt frames."

With the development of the tilt frame the art also developed a container, designed to be supported by the tilt frame, which can be rolled on and off the tilt frame. Such containers, referred to as "roll-off" containers, can be placed at a location, for example a construction site, accessible by a vehicle equipped with a tilt frame and remain at the location for an indefinite period of time to serve as a receptacle for whatever it is desired to be placed therein. It is obvious that the presence of the tilt frame vehicle is not required while the roll-off container is being employed as a receptacle.

Upon placement of the roll-off container on the tilt frame it becomes important, especially prior to transport, that the weight of the load be ascertainable. For commercial reasons, the transport company may desire to know the weight of the load for billing purposes. For legal reasons, the transport company may desire to know if the weight of the load is within state and/or federal highway weight limits. For safety reasons, the transport company may desire to know the weight of the load as a guide to the operation and mechanical limitations of the vehicle transporting the load.

SUMMARY OF THE INVENTION

By this invention there is provided a method of determining the weight of a load in a container which is supported on a frame. The method comprises supporting the container on a portion of the frame which is capable of supporting the weight of the load; completely lifting the container from the portion of the frame which is capable of supporting the weight of the load while, simultaneously, directly transferring the container to a portion of the frame capable of weighing the load; detecting the effect of the weight of the load on the load weighing portion of the frame; generating a signal representative of the effect of the weight of the load on the load weighing portion of the frame; converting said signal to a value representative of the weight; storing the value; and removing the container from the load weighing portion of the frame while, simultaneously, replacing the container on the load carrying portion of the frame.

The above method is conducted without removing the container itself from the frame; or transporting the load to some other location to determine weight; or without having to lift the frame and container relative to ground.

The method of this invention can be conducted, as hereinafter described, by use of the apparatus of this invention and associated equipment all of which can be attached to a frame, such as a tilt frame.

BRIEF DESCRIPTION OF THE DRAWINGS

FIG. 1 also broadly depicts two apparatus of this invention and related equipment, lines and wiring attached to a portion of the truck referred to as a tilt frame upon which rests the previously mentioned roll-off container.

FIG. 2 is a schematic rear view of the truck shown in FIG. 1 taken in the direction 2—2. FIG. 2 shows the lower rear portion of the roll-off container being supported by the tilt frame which itself is shown being supported by the truck frame and chassis. FIG. 2 also broadly depicts two apparatus of this invention and related equipment, lines and wiring attached to the tilt frame upon which rests the previously mentioned roll-off container. The apparatus of this invention are depicted in FIG. 2 in the non-weighing position which is also the driving position.

FIG. 2A is an expanded view of the area surrounded by the dashed line 2A in FIG. 2. FIG. 2A provides an enlarged view of the apparatus of this invention, the method of attachment thereof to the tilt frame and the spacial relationship between the apparatus and container. FIG. 2A also provides an expanded view of the portion the roll-off container which rests on and is supported by the tilt frame and, ultimately, by the truck frame and chassis.

FIG. 3 is a schematic expanded view the truck shown in FIG. 1 taken in the direction 3—3. The apparatus of this invention are depicted in FIG. 3 in the weighing position. Thus, the roll-off container is shown as being completely supported by the apparatus of this invention which are themselves shown being supported by the tilt frame, and truck chassis. FIG. 3 also broadly depicts two apparatus of this invention and related equipment, lines and wiring attached to the tilt frame. FIG. 3, like FIG. 2A, provides an enlarged view of the apparatus of this invention and the method of attachment thereof to the tilt frame.

FIG. 4 specifically provides an enlarged cross-sectional view of the weighing apparatus of this invention in the non-weighing position. The section is taken along the diameter of the apparatus which is perpendicular to the tilt frame.

FIG. 4A, which is viewed from the same direction as FIG. 4, specifically provides an enlarged view of the outside surface of the weighing apparatus of this invention in the non-weighing position. A shroud which normally shields the exterior of the apparatus is removed to expose the portion of the apparatus protected by the shroud.

FIG. 5 specifically provides an enlarged cross-sectional view of the weighing apparatus of this invention in the weighing position. The section is taken along the diameter of the apparatus which is perpendicular to the tilt frame.

FIG. 6 is the top view of the weighing apparatus of this invention taken in the direction 6—6 as shown in FIG. 1. The top of the shroud covering the top of the apparatus and the top of the apparatus itself are partially broken out.

FIG. 10 is a schematic isometric drawing of four apparatus of this invention configured to lift and weigh a load from four locations together with the associated hydraulic and electronic lines and components.

DESCRIPTION OF THE PREFERRED EMBODIMENTS

Figure 1:
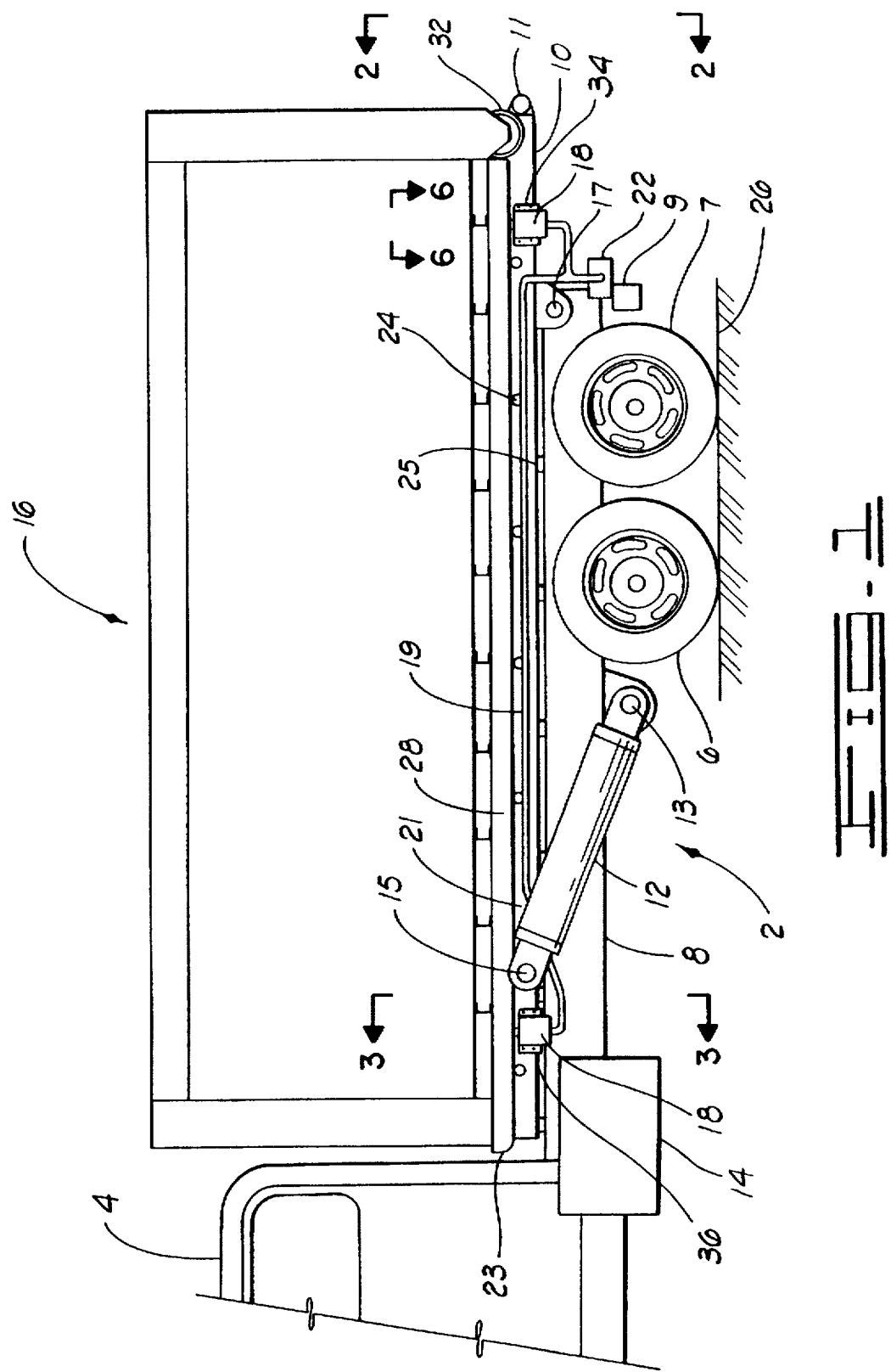
FIG. 1 is a schematic side view of the rear portion of a truck having placed thereon and supporting a roll-off container and any material confined therein to be weighed according to the method and apparatus of this invention.

Referring now to FIGS. 1, 2, 2A and 3 there is shown the rear portion of a truck 2 comprising cab 4, rear wheels 6 and 7, chassis frame 8, bumper 9, tilt frame 10, hydraulic lifting assembly 12, hydraulic power and hydraulic fluid storage equipment 14 and pivot and pin assembly 17. Hydraulic lifting assembly 12 is attached to chassis frame 8 at pivot and pin assembly 13 and to rails 21 of tilt frame 10 at pivot and pin assembly 15. Rails 21 of tilt frame 10 are also attached to chassis 8 by pivot and pin assembly 17 and are supported on chassis 8 by a plurality of spacers 25 attached to the top surface of chassis frame 8. As is well understood in the art, upon pumping of hydraulic fluid into hydraulic lifting assembly 12 from hydraulic fluid storage equipment 14 by way of hydraulic lines (not shown), hydraulic lifting assembly 12 is caused to extend and thereby rotate tilt frame 10 from its support position on chassis 8, as shown in FIG. 1, in a curved path around pivot and pin assembly 17. As is still further well understood in the art, tilt frame 10 is caused to rotate by an amount sufficient to enable a container, such as roll-off container 16, to be pulled thereon, by equipment (not shown) attached to truck 2, from a resting position on the ground surface 26 over roller 11 at the rear of tilt frame 10 and, eventually, upon simultaneous retraction of assembly 12, rolled on rails 21 of tilt frame 10 via rollers 23 attached to the front of container 16 to the support position shown in FIG. 1.

Bottom support rails 28 of roll-off container 16 overlap rails 21 and are shown placed on and fully supported by a plurality of rollers 24 which are attached to and project outwardly from the sides of rails 21. Roll-off container 16, due to the contact between support rails 28 and rollers 24, is thus fully supported by tilt frame 10. Containers such as roll-off container 16 are well known in the art. An example of which is available from Galbreath Inc., of Winamac, Ind.

Attached to tilt frame 10 at the side of rail 21, by means of pads 34 and bolts 36, are hydraulically actuated weighing apparatus 18 of this invention. Weighing apparatus 18 are in electrical communication, via signal lines 19, with analog to digital converter 22, which is supported by bumper 9. Signal lines 19 and associated hydraulic actuation lines (not shown) are attached to and extend along the side of rails 21 to a hinge connection at a point to the rear of pivot and pin assembly 17 whereby the lines 19 and apparatus 18 may move in conjunction with the movement of tilt frame 10. The apparatus 18, and associated lines, due to their location on a tilt frame truck are sometimes referred to herein as "side-mount units."

Referring more specifically now to FIGS. 2 and 2A it is noted that the left and right sides of FIGS. 2 and 2A are mirror images. Accordingly, for purposes of simplicity only, so as to avoid a needless proliferation of numbers and indicator lines, features appearing on both left and right are not always each identified.

FIGS. 2 and 2A show the apparatus 18 of this invention in the non-weighing/driving position, accordingly, bottom support rails 28 of roll-off container 16 are shown to be completely supported by rollers 24 which are attached to and project outwardly from the side of rails 21 of tilt frame 10. The load to be weighed, i.e., container 16 and the contents thereof, is thus shown to be completely supported vertically above apparatus 18 on a planar platform defined by the tops of rollers 24. Therefore, even though apparatus 18 are connected to tilt frame 10, the weighing apparatus of this invention, when in the non-weighing/driving position, are completely isolated from the load.

The loading/unloading procedure of container 16 was previously described. It can now be seen in FIGS. 2 and 2A that rollers 23 attached to the forward end of container 16 (FIG. 1) are positioned between bottom support rails 28 to thereby enable rollers 23 to engage and roll along the top surface of the extensions 30 which are attached to the outside upper surface of rails 21. By this arrangement rollers 23, rails 21 and rails 28 cooperate to align rails 28 vertically above apparatus 18 to facilitate the weighing of roll-off container 16. It will be understood that rollers 32, attached to the bottom rear corners of container 16, contact and roll along ground surface 26 during at least a portion of the loading/unloading procedure of container 16 when hydraulic lifting assembly 12 is extended and tilt frame 10 is not supported by spacers 25.

Also shown in FIGS. 2 and 2A are hydraulic actuation lines 38 which connect apparatus 18 with hydraulic fluid storage equipment 14.

Referring more specifically now to FIG. 3 it is noted that the left and right sides of FIG. 3 are mirror images. Accordingly, for purposes of simplicity only, so as to avoid a needless proliferation of numbers and indicator lines, features appearing on both left and right are not always each identified.

FIG. 3 shows the apparatus 18 of this invention in the weighing position, accordingly, bottom support rails 28 of roll-off container 16 are shown to be completely supported by apparatus 18. The load being weighed, i.e., container 16 and the contents thereof, is thus shown to be completely supported by apparatus 18 in a position vertically above a planar platform defined by the tops of rollers 24. Since apparatus 18 are connected to tilt frame 10 at rails 21, the weighing apparatus of this invention, when in the weighing position, are not isolated from the load and, in fact, bear the full weight of the load.

Also shown in FIG. 3 are hydraulic actuation lines 38 which connect apparatus 18 with hydraulic fluid storage equipment 14.

There is no structural difference between apparatus 18 as shown in FIG. 2A and as shown in FIG. 3. The differences to be noted when comparing FIG. 2A and FIG. 3 is the change in spacial relationships between the various parts of roll-off container 16 and tilt frame 10 and the stationary and movable sections of the weighing apparatus of this invention caused by the apparatus being changed from the retracted, i.e., non-weighing, position shown in FIG. 2A to the extended, i.e., weighing, position shown in FIG. 3. Accordingly, in the non-weighing position the load is maintained and supported by the tilt frame at one level or plane, and in the weighing position the load is also maintained and supported by the tilt frame but at a second level or plane vertically above the first level or plane. Although the vertical distance of the load itself to ground will directly vary depending upon the extended or retracted condition of the apparatus of this invention, the vertical distance of the tilt frame 10 to ground, once it is supported by the chassis 8, remains constant whether the apparatus of this invention is in extended or retracted condition.

From the foregoing it is clear that even though the load to be weighed is at all times ultimately supported by tilt frame 10 and chassis 8, the method of transferring the load to tilt frame 10 varies depending upon the extended or retracted position of the weighing apparatus of this invention.

It is further emphasized, when considering the weighing apparatus of this invention in the context of weighing a load consisting of a roll-off container and its contents supported on a tilt frame as shown in FIGS. 1, 2, 2A and 3, that all four involved weighing apparatus act together. Accordingly, all apparatus are subject to the same hydraulic fluid at the same time and all apparatus are simultaneously in the weighing, non-weighing or some transition position. Therefore, the different positions of the apparatus as shown in FIGS. 2A and 3 are illustrative only and would not occur at the same time.

Even though all apparatus act together, it is possible, and indeed probable, that each weighing apparatus would be subject to and, therefore, detect a different weight. This condition would be expected principally due to the structure of the container itself and the character and distribution of the contents thereof.

Figure 4:
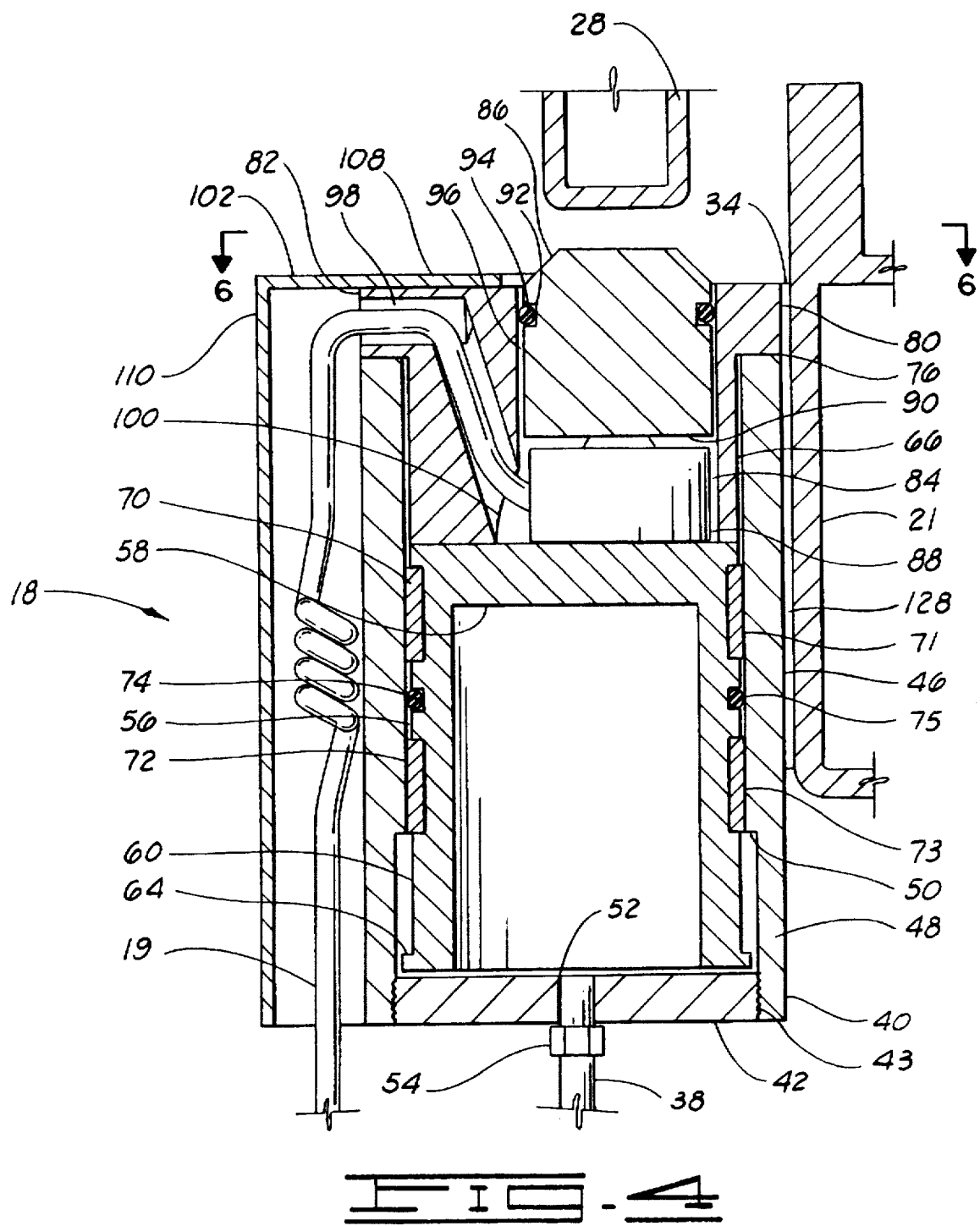
FIG. 4 is an expanded view of the area surrounded by the dashed line 4 in FIG. 2A.
Figure 4A:
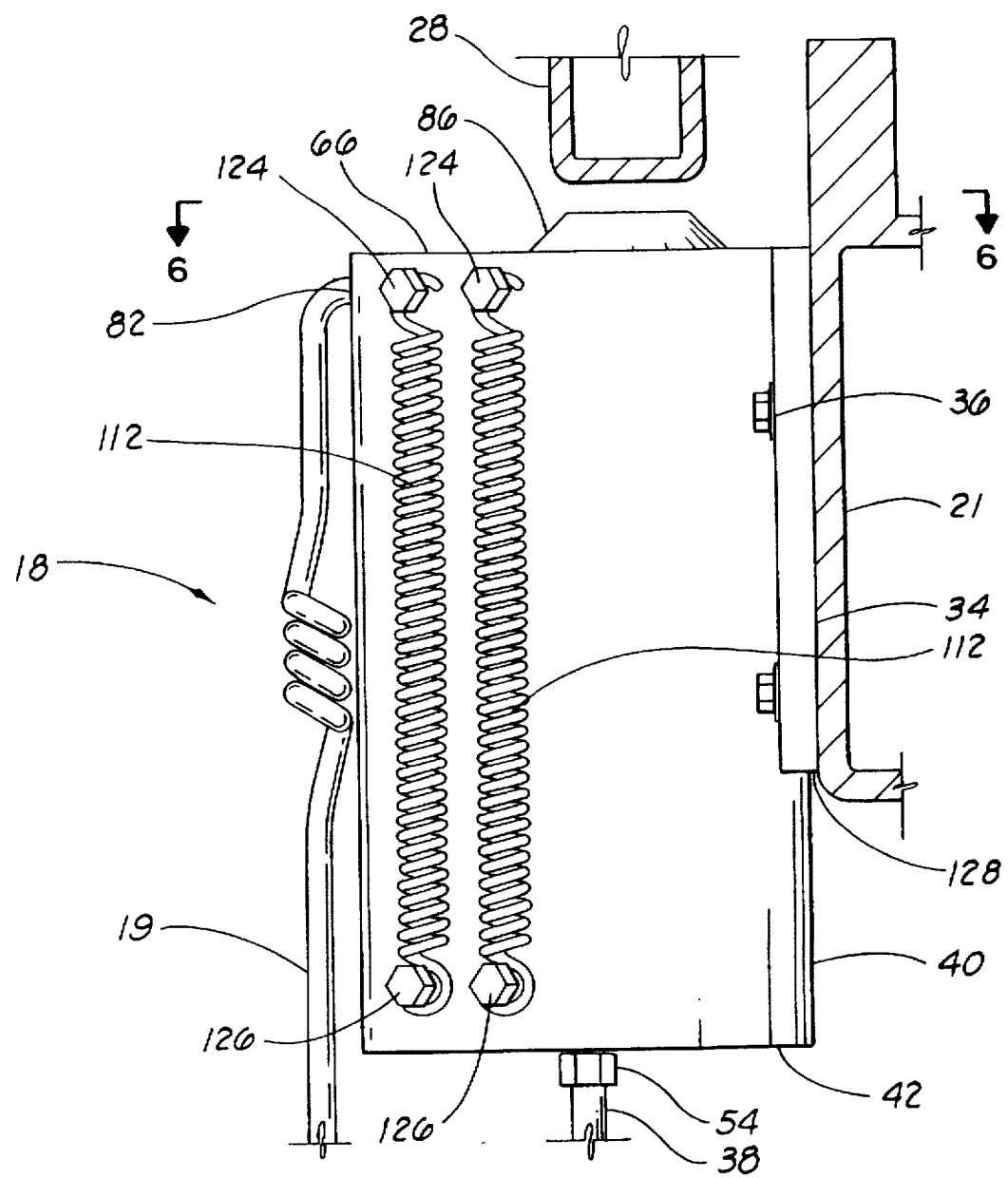
FIG. 4A is an expanded view of the area surrounded by the dashed line 4 in FIG. 2A.
Figure 5:
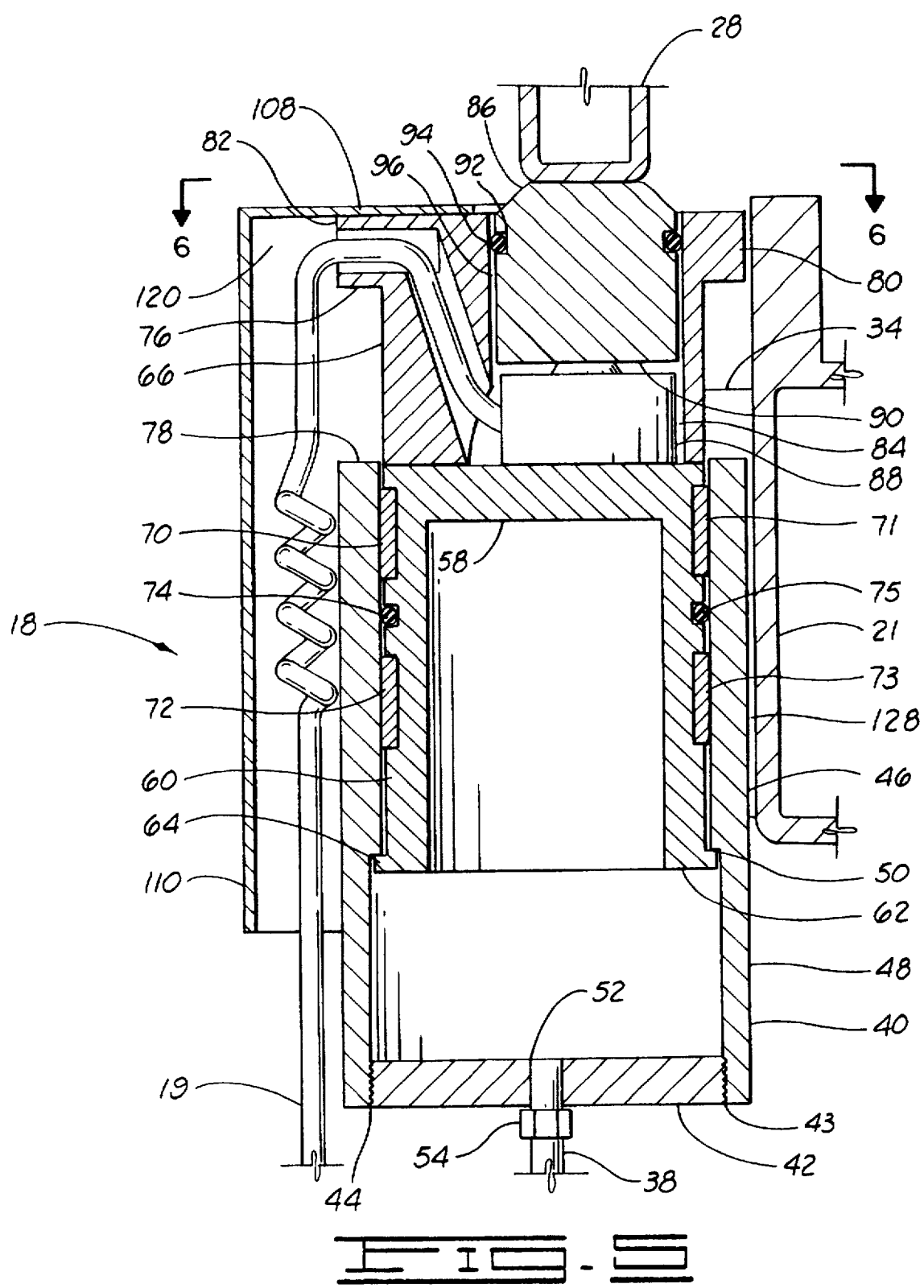
FIG. 5 is an expanded view of the area surrounded by the dashed line 5 in FIG. 3.

Referring now to FIGS. 4, 4A, 5 and 6, the weighing apparatus 18 of this invention is shown in the retracted, non-weighing, condition in FIGS. 4 and 4A and in the extended, weighing, position in FIG. 5. The top of the weighing apparatus 18 is shown in FIG. 6.

Accordingly, apparatus 18 comprises a first tubular structure having a hollow interior, an open upper end, a closed lower end and containing, in the hollow interior, a second tubular structure, and a weight sensor.

The first tubular structure, the stationary component of the apparatus of this invention, is the exterior housing of the apparatus of this invention and is attached to side rail 21 of tilt frame 10 by means of pads 34 and bolts 36. The first tubular structure comprises cylinder 40, having a constant outside diameter and a variable inside diameter, and circular bottom 42, which is removably attached to the lower end 44 of cylinder 40 by any means, such as threads 43. Cylinder 40 comprises an upper sidewall 46 and a lower sidewall 48. The thickness of upper sidewall 46 is greater than the thickness of lower sidewall 48. Accordingly, sidewall 46 and sidewall 48 meet to form inside shoulder 50. Accordingly, the inside diameter of the upper portion of cylinder 40, defined by sidewall 46, is less than the inside diameter of the lower portion of cylinder 40, defined sidewall 48. The bottom 42, which closes the lower end of the first tubular structure, contains an axial hole 52 to which is attached hydraulic actuation line 38 which connects apparatus 18 with hydraulic fluid storage equipment 14. Line 38 is connected to hole 52 by any suitable removable attachment means as represented by nut 54.

The second tubular structure, the movable component of the apparatus of this invention which is partially contained within and adapted to axially slide in the upper portion of cylinder 40 adjacent to upper sidewall 46, consists of a hollow interior, an upper end portion, and a lower end portion, wherein the upper end portion and the lower end portion are isolated one from the other. The upper end portion is cylinder cap 66, the lower end portion is cylinder 56, wherein cylinder cap 66 and cylinder 56 are isolated one from the other by top 58.

Cylinder 56, which has a constant outside diameter and a constant inside diameter, comprises circular top 58 and sidewall 60 having an outside shoulder 64 extending outwardly from the bottom 62 thereof. The axis of cylinder 56 coincides with the axis of cylinder 40. Ring grooves 70, 72 and 74 are cut into the outer surface of sidewall 60. Wear rings 71 and 73 are fitted into grooves 70 and 72 and O-ring 75 is fitted into groove 74.

The outside diameter of cylinder 56 is less than the inside diameter of the upper portion of cylinder 40, and less than the inside diameter of the lower portion of cylinder 40 at shoulder 64. Accordingly, sidewall 60 does not have any sliding contact with cylinder 40. Furthermore, bottom 62 of sidewall 60 does not contact bottom 42 of cylinder 56 even when the apparatus is in the retracted, i.e. non-weighing, condition. In fact, the only contact between cylinder 56 and cylinder 40 occurs between shoulder 50 and shoulder 64 when the apparatus is in the extended, i.e. weighing, position.

Wear rings 71 and 73 slide against the inside of sidewall 46 and function to reduce friction and to resist the effects of side loading which may be caused by the application of loads from positions not coincident with the axis of cylinder 56.

O-ring 75 functions to provide a hydraulic seal between side wall 46 and sidewall 60 to thereby confine hydraulic pressure to the lower portion of cylinder 40 and cylinder 56.

Cylinder cap 66 is attached to top 58 by bolts 68 which pass through holes 69 drilled through cylinder cap 66 and screw into threaded holes in top 58 wherein the bolt heads are recessed into the top surface of cylinder cap 66 and do not extend above the top surface of cylinder cap 66. Cylinder cap 66 consists of a lower portion having an outside diameter equal to the outside diameter of cylinder 56 and an upper portion having an outside diameter greater than the outside diameter of cylinder 40. The lower portion of cylinder cap 66 and the upper portion of cylinder cap 66 meet to form outside shoulder 76. In the retracted, non-weighing, position of the apparatus of this invention outside shoulder 76 contacts the upper surface 78 of sidewall 46. In fact, the only contact between cylinder cap 66 and cylinder 40 occurs between shoulder 76 and upper surface 78 when apparatus 18 is in the retracted, i.e. non-weighing, position.

Accordingly, it is to be understood that the upper portion of cylinder cap 66, in the non-weighing position, serves to close the upper end of cylinder 40.

The upper portion of cylinder cap 66 is truncated along parallel lines 80 and 82. Lines 80 and 82 are perpendicular to each end of the diameter of upper portion of cylinder cap 66 which is perpendicular to side rail 21. For purposes of this description, this diameter shall be referred to as the truncation diameter. The purpose of the truncation is to avoid any potential interference which could be caused by the cylinder cap 66 extending beyond the exterior housing of the apparatus adjacent to rail 21 and signal line 19.

Cylindrical cavity 84 is disposed vertically through cap 66. The center of cavity 84, as shown, is situated along the mentioned truncation diameter, but the axis of cavity 84 does not coincide with the axis of cylinder cap 66, cylinder 56 or cylinder 40. As shown in FIGS. 4 and 5, the center of cavity 84 is biased toward side rail 21. The purpose of the off-center positioning of cavity 84 is to enable the placement of the weight sensor assembly of this invention, load contact button 86 and load cell 88, in cavity 84 as close possible to the center line of the load transfer means, represented herein as rail 28, as may be permitted in view of the physical size of the apparatus and the designs of the truck chassis, tilt frame and the roll-off container. It would be preferable, in order to avoid the effects of side loading, that the center line of the load transfer means coincide with the axis of cavity 84, cylinder 56 and cylinder 40. However, the apparatus of this invention, as embodied in FIGS. 4 and 5, is operable not withstanding the specific off-center location of cavity 84 in cylinder cap 66.

Load button 86 contains ring groove 92 which holds O-ring 94. O-ring 94 functions to provide a seal between the inside wall of cavity 84 and the outside wall of load button 86 to thereby prevent the entry of moisture, dirt and other foreign material into the annular space 96 which separates load button 86 and load cell 88 from the inside wall of cavity 84. Neither Load button 86 nor load cell 88 are intended to slide against the wall of cavity 84; in fact, O-ring 94 is the only part of the weight sensor assembly which is intended to touch the wall of cavity 84.

Hole 98 is radially disposed in the upper portion of cylinder cap 66 along the said truncation diameter from the exterior wall thereof toward, but does not intersect, cavity 84. Hole 100 is angularly disposed in the lower portion of cylinder cap 66 from the inside wall thereof upwardly toward and does intersect hole 98. Signal line 19 passes from load cell 88 through cylinder cap 66 by way of hole 100 and hole 98.

The weight sensor assembly of this invention, load button 86 and load cell 88, is positioned in cavity 84 and functions to directly sense the weight of the load to be measured. Load button 86 is a hard, solid, cylindrical plug, having a truncated conical top. The only part of the weight sensor assembly which is not completely retained within cavity 84 is the truncated top of load button 86. Upon extension of the apparatus, load button 86, which is an element of the movable component of this invention, is caused to rise into contact with rail 28 to enable the apparatus to lift container 16 from rollers 24 to thereby transfer the weight of the load from rollers 24 to the apparatus of this invention. (See FIG. 5) Since rollers 24 and the apparatus of this invention are both attached to rail 21 the weight of the load is at all times supported by rail 21. As the weight of the load is lifted from rollers 24 it is simultaneously and completely transmitted by plug 86 to and sensed by load cell 88. As shown in FIG. 5 the load transfer occurs at contact area 90 at the bottom of plug 86 and the top of load cell 88.

Load cell 88 is a compression strain gauge of the type well known in the art which converts mechanical compression into an analog electric signal. It is well known that load cells of the type useful herein produce a change in electrical resistance in proportion to applied load. To maintain a given amperage, the change in resistance causes a variation in voltage, which is measured and transmitted from load cell 88 via signal lines 19 to analog to digital converter 22. The voltage variation is referred to as a signal. A load cell useful herein is available from Transducer Techniques of Temecula, Calif. One such device of particular use herein, in combination with four apparatus to measure the weight of a roll off container supported on a tilt frame, as described herein, is designated as Model LB-15K having a capacity of 15,000 pounds.

Apparatus 18 is partially covered by shroud 102 which consists of a top surface 108 and formed sidewalls 110. Shroud 102 partially covers springs 112 and the exterior walls and top surface of cylinder cap 66. Shroud 102 is attached to cylinder cap 66 by means of bolts 104 which pass through shroud 102 and are screwed into threaded holes 106 drilled into the top surface of the upper portion of cylinder cap 66.

Shroud 102 and the exterior of apparatus 18 cooperate to form raceway 120 through which signal line 19 passes after it emerges from cylinder cap 66.

The tops of springs 112 are attached to cylinder cap 66 by means of bolts 124 which are screwed into threaded holes which are drilled into the upper portion of cylinder cap 66. The bottoms of springs 112 are attached to cylinder 40 by means of bolts 126 which are screwed into threaded holes which are drilled into the exterior wall cylinder 40. Springs 112 operate to move shoulder 76 to contact surface 78. Accordingly, springs 112 operate to bias the apparatus of this invention to the retracted position.

It was previously mentioned that the apparatus of this invention is attached to rail 21 by pads 34 and bolts 36. Note that pad 34 is divided into two parts, wherein each of the two parts is attached to the surface of cylinder at spaced points to prevent cylinder 40 itself from actually contacting rail 21. Accordingly, pads 34 are attached to cylinder 40 by weld beads 130 and 132 along lines sufficiently separated from the mentioned truncation diameter to position the said diameter perpendicular to rail 21 and to establish and maintain separation 128 between cylinder 40 and rail 21. This method of attachment enables load button 86 to be positioned more closely to a line vertically below the center of load transfer application means represented by rail 28 while at the same time resisting any tendency of the apparatus of this invention to roll along the side of rail 21.

FIG. 10 depicts apparatus 18 to be in electrical communication with analog to digital converter 22 by means of signal lines 19 and analog to digital converter 22 to be in electrical communication with computer, data storage and digital readout and printer terminal 27 by means of signal lines 20. FIG. 10 also depicts apparatus 18 to be in hydraulic communication with hydraulic power and hydraulic fluid storage equipment 14 by means of hydraulic lines 38. The attachment and location of apparatus 18, hydraulic equipment 14 and lines 19 and 38 have been previously described. Computer, data storage and digital readout and printer terminal 27 may be placed in any location convenient for the operator, such as in the interior of cab 4 of truck 2.

Analog to digital converter 22 and terminal 27 are conventional devices which are commercially available from various sources such as models PT-8000 and RTS-96D from Adrian J. Paul Co., Duncan, Ok.

Figure 8:
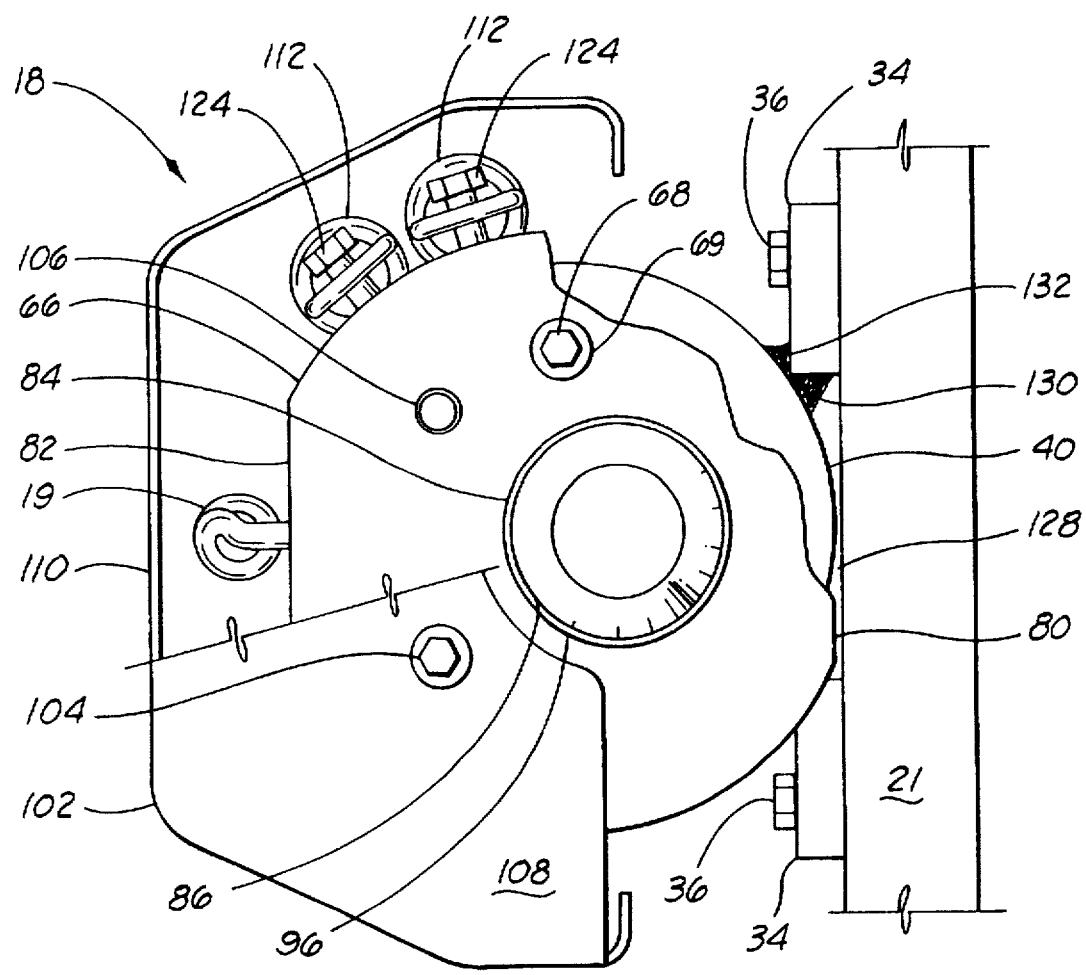
FIG. 8 is an enlarged cross-sectional view of the alternative version of the weighing apparatus of this invention in the weighing position. The section is taken along the diameter of the apparatus which is perpendicular to the tilt frame.
Figure 7:
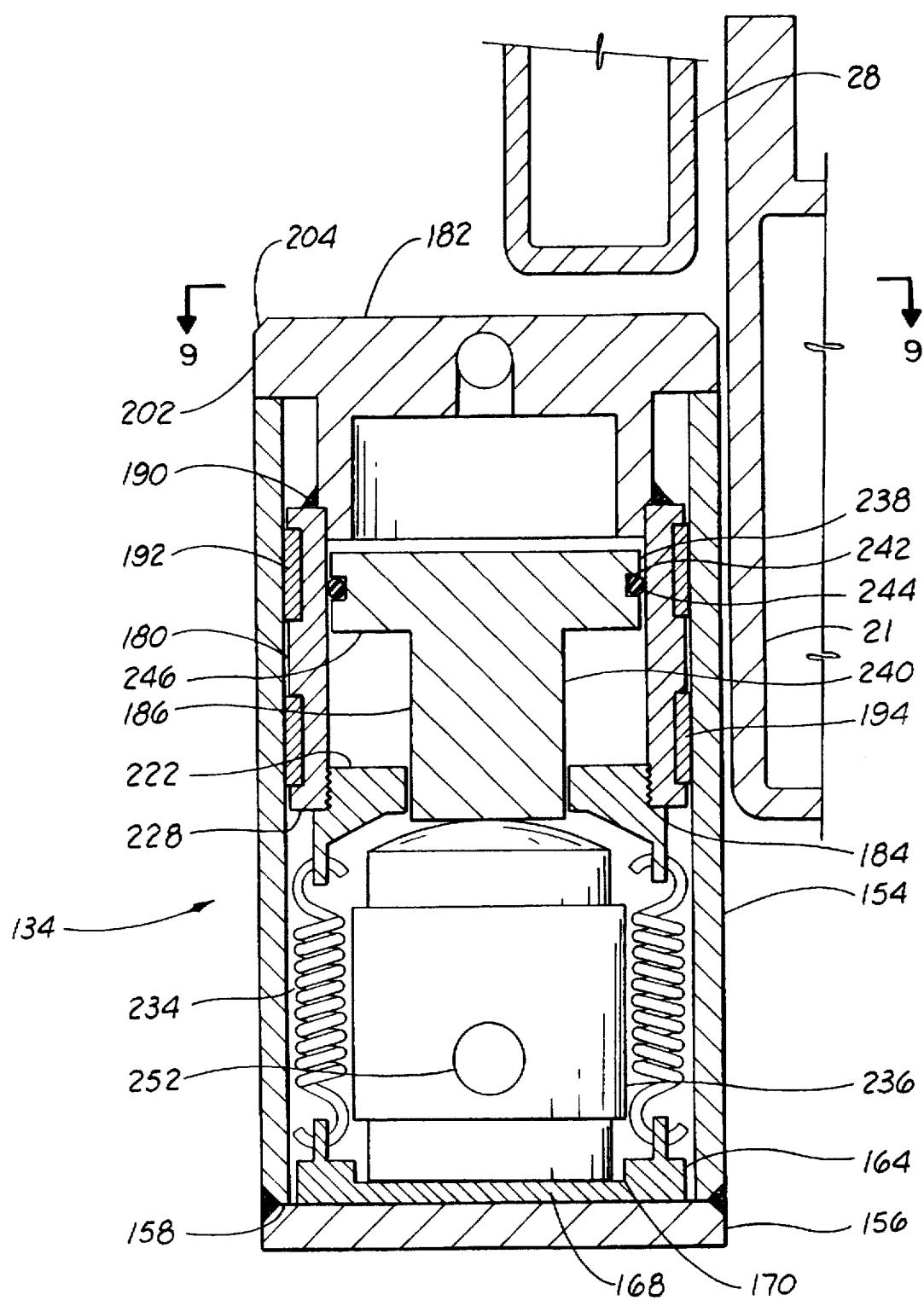
FIG. 7 is an enlarged cross-sectional view of the alternative version of the weighing apparatus of this invention in the non-weighing position. The section is taken along the diameter of the apparatus which is perpendicular to the tilt frame.
Figure 8:
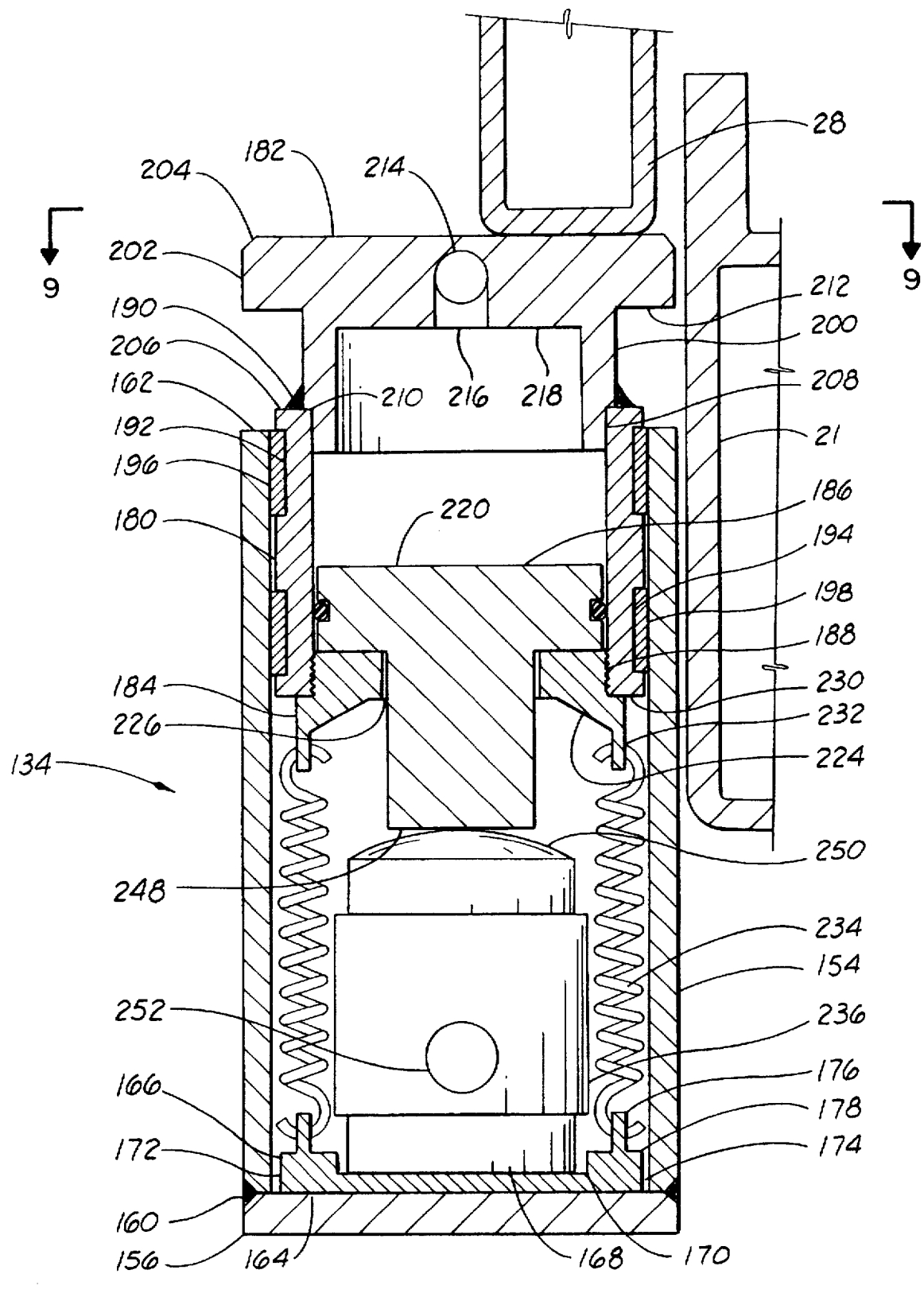
Figure 9:
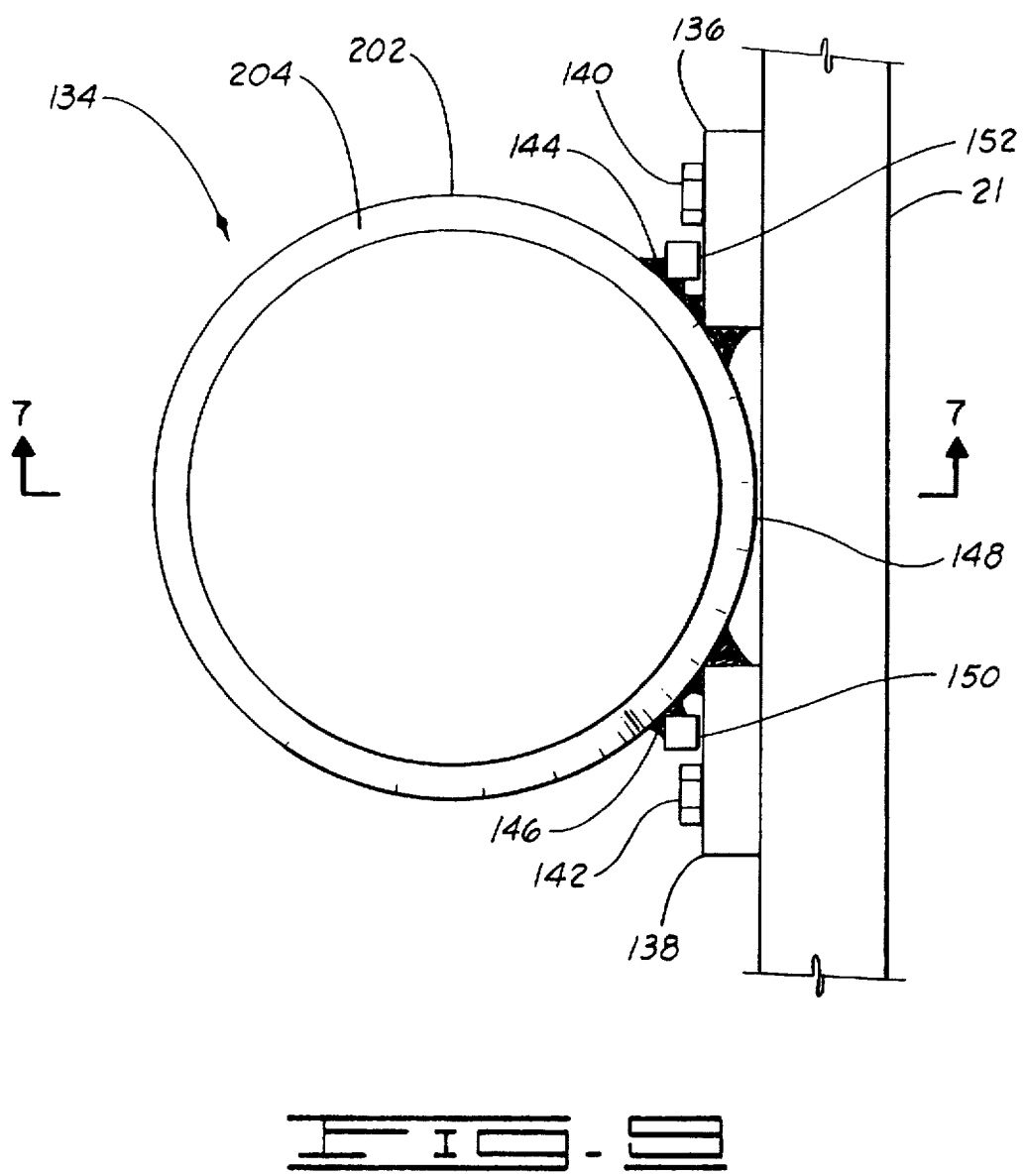
FIG. 9 is the top view of the alternative version of the weighing apparatus of this invention.

Referring now to FIGS. 7, 8 and 9, apparatus 134, an alternate version of the weighing apparatus of this invention, is shown in the retracted, non-weighing, condition in FIG. 7 and in the extended, weighing, position in FIG. 8. The top of the weighing apparatus 134 is shown in FIG. 9.

Apparatus 134 comprises a first tubular structure having a hollow interior, an open upper end, a closed lower end and containing, in the hollow interior, a second tubular structure, and a weight sensor.

The first tubular structure, the stationary component of the apparatus of this invention which is the exterior housing of apparatus 134, is attached to side rail 21 of tilt frame 10 by means of pads 136 and 138 and bolts 140 and 142. Pads 136 and 138 are attached to apparatus 134 by weld beads 144 and 146. The distance between pads and 136 and 138 is adjusted to maintain gap 148 between side rail 21 and the exterior surface of apparatus 134. Any tendency of apparatus 134 to rotate is opposed by rods 150 and 152 which are held against apparatus 134 by weld beads 144 and 146.

The first tubular structure comprises cylinder 154, having a constant outside diameter and a constant inside diameter, solid circular bottom 156, which is permanently attached to the bottom circular surface 158 of cylinder 154 by any means, such as, butt weld 160, and load cell base 164. The top of cylinder 154 is indicated by surface 162.

Load cell base 164, a solid circular plate, is removably, but rigidly, attached to the inside surface of circular bottom 156 by screws which are not shown, wherein the axes of cylinder 154, bottom 156 and load cell base 164 coincide. Load cell base 164 has a thickened circumferential edge 166. The top surface 168 of load cell base 164 and inside wall 170 of circumferential edge 166 combine to form a circular pocket on the inside bottom of apparatus 134. The outside diameter of load cell base 164, which extends to the outside wall 172 of circumferential edge 166, is less than the inside diameter of cylinder 154 to thereby produce annular gap 174.

Vertical loops 176 are rigidly and permanently attached to the top surface 178 of circumferential edge 166 at the opposite ends of a diameter of load cell base 164. Vertical loops 176 extend upwardly from surface 178. The hole of each loop faces the other.

The second tubular structure, the movable component of apparatus 134, is partially contained within and adapted to axially slide in the upper portion of cylinder 154 and comprises cylinder 180, cylinder cap 182 and circular rod end cap 184. Cylinder cap 182, situated at the upper end of cylinder 180, is isolated from rod end cap 184, situated at the lower end of cylinder 180, by piston 186.

Cylinder 180, which has a constant outside diameter and a constant inside diameter, is rigidly attached, at the bottom thereof, to rod end cap 184 by threads 188, and is rigidly attached, at the top thereof, to cylinder cap 182 by weld 190. The axis of cylinder 180 coincides with the axis of cylinder 154. Ring grooves 192 and 194 are cut into the outer surface of cylinder 180. Wear rings 196 and 198 are fitted into grooves 192 and 194.

The outside diameter of cylinder 180 is less than the inside diameter of cylinder 154. Accordingly, cylinder 180 does not have any sliding contact with cylinder 154.

Wear rings 196 and 198 slide against the inside of cylinder 154 and function to reduce friction and to resist the effects of side loading which may be caused by the application of loads from positions not coincident with the axis of cylinder 180.

Cylinder cap 182 comprises a hollow, cylindrical lower portion 200 and a solid, circular top 202, wherein the lower portion 200 of cylinder cap 182 is attached to top wall surface 206 of cylinder 180 by weld 190. The outside diameter of top 202 is equal to the outside diameter of cylinder 154. Accordingly, in the retracted position, as seen in FIG. 7, shoulder 212 of top 202 is in contact with surface 162 of cylinder 154 to thereby close the open upper portion of apparatus 134. The top edge of top 202 is beveled to form chamfer 204. It is noted that top 202 is the only element of the second tubular structure which does not fit within cylinder 154. It is further noted that the outside top surface of top 202 is the only part of apparatus 134 which contacts rail 28, and that occurs only when the apparatus is in the weighing, i.e. extended, position as seen in FIG. 8.

The outside diameter of cylindrical portion 200 is greater than the inside diameter of cylinder 180, but less than the outside diameter of cylinder 180. The inside diameter of cylindrical portion 200 is less than the inside diameter of cylinder 180. Groove 208 is formed in the lower outside wall of cylindrical portion 200 whereby the outside diameter of portion 200, measured at the bottom of groove 208, is equal to the inside diameter of cylinder 180 to thereby permit cylindrical portion 200 to slide into cylinder 180. Shoulder 210, formed at the intersection of groove 208 and the outside surface of lower portion 200, contacts cylinder 180 at surface 206. Top 202 and cylindrical portion 200 intersect to form outside shoulder 212.

Radial hole 214 is drilled into top 202 to the center thereof. Axial hole 216 is drilled into the bottom of top 202 and intersects with radial hole 214. Radial hole 214 and axial hole 216 cooperate to form a passage into the interior of apparatus 134 and more specifically into the volume defined by the bottom surface 218 of top 202, the top surface 220 of piston 186, the interior wall surface of cylinder 180 and the interior wall surface of cylindrical portion 200.

Rod end cap 184 is a solid circular disc having a flat top surface 222 and a truncated concave conical bottom surface 224. Axial hole 226 is drilled through surface 222. The outside diameter of rod end cap 184, below threads 188, is greater than the inside diameter of cylinder 180 to thereby form shoulder 228. Accordingly, when rod end cap 184 is attached to cylinder 180 at threads 188, shoulder 228 abuts bottom surface 230 of cylinder 180.

Vertical loops 232 are rigidly and permanently attached to bottom surface 224 below shoulder 228 at the opposite ends of a diameter of rod end cap 184. Vertical loops 232 extend downwardly from surface 224 directly above loops 176 of load cell base 164. The hole of each loop faces the other.

Springs 234 are connected, at their opposite ends, to loops 232 and 176. As shown in FIG. 7, springs 234 function to bias the second tubular structure to the retracted position. In the retracted position shoulder 212 of cylinder cap 182 contacts surface 162 of cylinder 154. In fact, the only contact between cylinder cap 182 and cylinder 154 occurs between shoulder 212 and surface 162 when the apparatus, as shown in connection with apparatus 134, is in the retracted, i.e. non-weighing, position. Accordingly, it is to be understood that cylinder cap 182, in the non-weighing position, serves to close the upper end of cylinder 154.

The weight sensor component of this invention is comprised of piston 186 and load cell 236. Piston 186 is comprised of piston head 238 and piston rod 240. Groove 242 is cut into head 238 and contains O-ring 244 which contacts and slides against the inside wall of cylinder 180. O-ring 244 functions to provide a hydraulic seal between the inside wall of cylinder 180 and piston head 238 to thereby confine hydraulic pressure to the volume of the second tubular structure bounded by top surface 220 of piston 186, bottom 218 of cylinder cap 182 and the inside walls of cylinder 180 and cylinder cap 182. Piston 186 and O-ring 244 also function to isolate cylinder cap 182 from rod end cap 184. Piston rod 240 and piston head 238 join to form shoulder 246. In the extended position, as shown in FIG. 8, the vertical movement of the second tubular structure is terminated by contact between shoulder 246 and surface 222 of rod end cap 184.

Piston rod 240 extends through hole 226 in rod end cap 186. The diameter of piston rod 240 is less than the diameter of hole 226. Accordingly, the only intended contact between piston 186 and the second tubular structure occurs between shoulder 246 and surface 222 as above described. The bottom surface 248 of piston rod 240 is in contact with the top surface 250 of load cell 236 in the retracted condition, as seen in FIG. 7, and in the extended position, as seen in FIG. 8. The downward movement of piston 186 is thus limited by load cell 236. It is clear that any force applied to surface 220 of piston 186 is immediately and simultaneously transferred to load cell 236.

Load cell 236 is positioned in the circular pocket defined by top surface 168 of load cell base 164 and inside wall 170 of circumferential edge 166. Load cell 236 is a compression strain gauge of the type well known in the art which converts mechanical compression into an analog electric signal. It is well known that load cells of the type useful herein produce a change in electrical resistance in proportion to applied load. To maintain a given amperage, the change in resistance causes a variation in voltage, which is measured and transmitted from load cell 236 via signal lines, such as signal line 19, to an analog to digital converter, such as converter 22. (For example, see FIG. 3.) The signal line from load cell 236, not shown, exits load cell 236 through hole 252 and through a hole (not shown) in the wall of cylinder 154. The voltage variation is referred to as a signal. A load cell useful herein is available from Weigh-Tronix, Inc, of Fairmont, Minnesota. One such device of particular use herein, in combination with four apparatus to measure the weight of a roll-off container supported on a tilt frame, as described herein, is designated as Model CC-20 having a capacity of 20,000 pounds.

Upon extension of the apparatus, Cylinder cap 182, which is an element of the movable component of this invention, is caused to rise into contact with rail 28 to enable the apparatus to lift container 16 from rollers 24 to thereby transfer the weight of the load from rollers 24 to the apparatus of this invention. (See FIG. 8) Since rollers 24 and apparatus 134 are both attached to rail 21 the weight of the load is at all times supported by rail 21. As the weight of the load is lifted from rollers 24 it is simultaneously and completely transmitted by piston 186 to and sensed by load cell 236. As shown in FIG. 8, the load transfer occurs at the point of contact between bottom surface 248 of piston rod 240 and top surface 250 of load cell 236.

OPERATION OF THE INVENTION

The weight of roll-off container 16 and its contents is determined, according to the method of this invention, by first placing container 16 on rollers 24 of tilt frame 10 as previously described wherein no action is taken to restrain the vertical movement of container 16 on tilt frame 10.

Hydraulic power and hydraulic fluid storage equipment 14 is actuated to cause hydraulic fluid to be pressured from equipment 14 via hydraulic lines 38 to each weighing apparatus 18 (or 134) which is attached to rail 21 of tilt frame 10. In the context of this disclosure, four such apparatus are employed, wherein one apparatus is placed at each corner of tilt frame 10 under rail 28 of container 16, as seen in schematic in FIG. 10.

1. OPERATION OF APPARATUS 18.

Hydraulic fluid enters cylinders 56 and 40 of each apparatus 18 from lines 38 at hole 52. When hydraulic fluid is first introduced into cylinders 56 and 40, apparatus 18 is in the retracted condition as shown in FIGS. 4 and 4A. That is, the load, container 16 and its contents, is fully supported at a level defined by the top surfaces of rollers 24; load contact button 86 is vertically below, and not in contact with rail 28; and shoulder 76 is in contact with cylinder 40 at surface 78. It is to be understood that cylinders 56 and 40 of the apparatus, as shown in FIG. 4, may already be completely filled with hydraulic fluid in the volume essentially defined by top 58, bottom 42 and sidewall 60, but at a pressure less than that required to vertically lift cylinder 56 and cylinder cap 66.

As hydraulic fluid is pressured into cylinders 56 and 40, sufficient pressure is generated therein to cause cylinder 56 and cylinder cap 66 to vertically rise within cylinder 40, wherein only wear rings 71 and 73 and O-ring 75 of cylinder 56 slide along the inside of upper sidewall 46 of cylinder 40. Cylinder 56 and cylinder cap 66 continue to rise until shoulder 64 of cylinder 56 contacts shoulder 50 of cylinder 40 at which point all vertical movement terminates. As cylinder 56 and cylinder cap 66 rise, shroud 102, which is attached to the top of cylinder cap 66, and load contact button 86, load cell 88 and signal line 19, which are situated in cavity 84 of cylinder cap 66, also rise. When shoulder 64 contacts shoulder 50, to thereby terminate all vertical movement, the condition of apparatus 18, is as shown in FIG. 5, wherein the volume essentially defined by top 58, bottom 42, sidewall 60 and lower sidewall 48 is completely filled with hydraulic fluid under a pressure at least sufficient to maintain contact between shoulder 64 and shoulder 50.

There is no perceptible movement between the walls of cavity 84 and the contents thereof, load contact button 86, load cell 88 and signal line 19. (Actually, under a load of 15000 pounds the load sensor employing the specific commercial load cell referred to above will move 0.002 inches.) Accordingly, as cylinder 56 and cylinder cap 66 rise, as above described, the upper surface of load button 86 rises at the same rate and eventually contacts the bottom surface of rail 28 with the result that rail 28 begins to rise and continues to rise until shoulder 64 contacts shoulder 50. The maximum extension of the apparatus of this invention occurs when shoulder 64 contacts shoulder 50. As soon as load button 86 and rail 28 come into contact any and all weight exerted by container 16 and its contents at the area of contact between the upper surface of button 86 and rail 28 is immediately and simultaneously transferred to and sensed by load cell 88. Load cell 88 immediately generates an analog signal representative of such weight which signal is immediately transmitted by signal line 19 to analog to digital converter 22. Converter 22 changes the analog signal to a digital signal as it is received and then transmits the digital signal to computer, data storage and digital readout and printer terminal 27 via signal lines 20. Terminal 27 receives and analyzes the received digital signals, produces a visually perceptible display of the weight sensed at each apparatus, the total of the sensed weights and stores the same for future reference and/or printing. Terminal 27 also calculates and displays the center of gravity of the total weight as it is distributed in container 16.

When the weight of the load has been measured and recorded in terminal 27, the load is then returned to the support of rollers 24 of tilt frame 10 and, at that time, action is taken to restrain the vertical movement of container 16 on tilt frame 10 prior to transport of the load. To return the load to rollers 24, the hydraulic fluid in cylinders 56 and 40 by conventional operation of hydraulic power and hydraulic fluid storage equipment 14, is permitted to flow from the apparatus via lines 38 to equipment 14. The weight of the load on load buttons 86 will force the hydraulic fluid from cylinders 56 and 40 into lines 38; however, when the top surfaces of the load buttons are in the plane of the tops of rollers 24, the load is then supported by rollers 24. At that time, springs 112 act to force any fluid from the cylinders which may act to prevent shoulders 76 from contacting surfaces 78. It is evident then, that the principal function of springs 112 is to maintain the apparatus of this invention in the fully retracted position when the apparatus is not actually being engaged to determine the weight of a load. As is evident from FIGS. 4A and 6, no force is applied to load button 86 or load cell 88 by springs 112.

2. OPERATION OF APPARATUS 134.

Hydraulic fluid enters cylinder cap 182 and cylinder 180 of each apparatus 134 from lines 38 at holes 214 and 216. When hydraulic fluid is first introduced into cylinder cap 182 and cylinder 180, apparatus 134 is in the retracted condition as shown in FIG. 7. That is, the load, container 16 and its contents, is fully supported at a level defined by the top surfaces of rollers 24; the top surface of cylinder cap 182 is vertically below, and not in contact with rail 28; and shoulder 212 is in contact with cylinder 154 at surface 162. It is to be understood that cylinder cap 182 and cylinder 154 of the apparatus, as shown in FIG. 7, may already be completely filled with hydraulic fluid in the volume essentially defined by surface 218, surface 220 and cylindrical portion 200, but at a pressure less than that required to vertically lift cylinder cap 182, cylinder 180 and rod end cap 184.

As hydraulic fluid is pressured into cylinder cap 182 and cylinder 154, sufficient pressure is generated therein to cause cylinder cap 182, cylinder 180 and rod end cap 184 to vertically rise within cylinder 154, wherein only wear rings 196 and 198 slide along the inside of cylinder 154. It is noted that only upward vertical movement is possible due to the fact of the contact between piston rod 186, load cell 236 and load cell base 164. Cylinder cap 182, cylinder 180 and rod end cap 184 continue to rise until shoulder 246 of piston 186 contacts surface 222 of rod end cap 184 at which point all vertical movement terminates. It is noted that O-ring 244 contacts and slides along the inside wall of cylinder 180 as cylinder 180 moves by piston 186. It is not intended that any other contact occur between any other component of the weight sensor assembly and any other part of the second tubular structure.

When shoulder 246 contacts surface 222, to thereby terminate all vertical movement, the condition of apparatus 134, is as shown in FIG. 8, wherein the volume essentially defined by surface 218, surface 220, cylinder 180 and cylindrical portion 200 is completely filled with hydraulic fluid under a pressure at least sufficient to maintain contact between shoulder 246 and surface 222.

There is no perceptible movement at the point of contact between surface 248 and surface 250. (Actually, under a load of 20,000 pounds the load sensor employing the specific commercial load cell referred to above will move 0.004 inches.) Accordingly, as cylinder cap 182, cylinder 180, and rod end cap 184 rise, as above described, the top surface of cylinder cap 182 rises and eventually contacts the bottom surface of rail 28 with the result that rail 28 begins to rise and continues to rise until shoulder 246 contacts surface 222. The maximum extension of the apparatus of this invention occurs when shoulder 246 contacts surface 222. As soon as cylinder cap 182 and rail 28 come into contact any and all weight exerted by container 16 and its contents at the area of contact between the upper surface of cylinder cap 182 and rail 28 is immediately and simultaneously transferred to and sensed by load cell 236. Load cell 236 immediately generates an analog signal representative of such weight which signal is immediately transmitted by signal line 19 to analog to digital converter 22. Converter 22 changes the analog signal to a digital signal as it is received and then transmits the digital signal to computer, data storage and digital readout and printer terminal 27 via signal lines 20. Terminal 27 receives and analyzes the received digital signals, produces a visually perceptible display of the weight sensed at each apparatus, the total of the sensed weights and stores the same for future reference and/or printing. Terminal 27 also calculates and displays the center of gravity of the total weight as it is distributed in container 16.

When the weight of the load has been measured and recorded in terminal 27, the load is then returned to the support of rollers 24 of tilt frame 10 and, at that time, action is taken to restrain the vertical movement of container 16 on tilt frame 10 prior to transport of the load. To return the load to rollers 24, the hydraulic fluid in cylinder cap 182 and cylinder 180, by conventional operation of hydraulic power and hydraulic fluid storage equipment 14, is permitted to flow from the apparatus via lines 38 to equipment 14. The weight of the load on cylinder cap 182 will force the hydraulic fluid from cylinder cap 182 and cylinder 180 into lines 38; however, when the top surfaces of cylinder caps 182 are in the plane of the tops of rollers 24, the load is then supported by rollers 24. At that time, springs 234 act to force any fluid from the volume which may act to prevent shoulder 212 from contacting surface 162. It is evident then, that the principal function of springs 234 is to maintain the apparatus 134 in the fully retracted position when the apparatus is not actually being engaged to determine the weight of a load.

As is evident from FIGS. 7 and 8, some force is indirectly applied to load cell 236 by springs 234. The effect of such force is taken into account by computer 27.

3. GENERAL COMMENT.

When lifting a load supported on a frame with multiple apparatus, such as described herein, it will be appreciated that the specific weight lifted, and consequently sensed, by one apparatus may not be the same as the weights lifted by the other apparatus. Consequently, the apparatus lifting the lightest weight will attain maximum extension first and the apparatus lifting the heaviest weight will attain maximum extension last. That is, all apparatus employed to lift a given load, especially one having a non-uniform weight distribution, will not extend at the same rate of lift. If container 16 contains trash or debris in random distribution or some other non-uniform loading, it is to be anticipated that all four apparatus, as seen in FIG. 10, will achieve maximum extension at different times.

When each weighing apparatus 18 or 134 involved in lifting a given load attains maximum extension, a short period of time elapses, then computer, data storage and digital readout and printer terminal 27 will produce the results described above. It will be appreciated that upon lifting a load, especially when the load is not lifted at the same rate, as explained above, the load is caused to shake and perhaps change position and/or vibrate. Such shaking and vibrating can produce transient observations and inaccurate results. The mentioned short period of time enables the load cell in each apparatus and the computer to stabilize transient observations to thereby produce a reliable result. It is believed that a combination of four lifting and weighing apparatus of this invention, when employed as described in connection with FIGS. 1 through 10 and when lifting a load of up to about 60,000 pounds, will stabilize transient observations in about 10 seconds or less.

Having thus described the invention that which is claimed is:

1. An apparatus for weighing a load comprised of a stationary first tubular structure having a hollow interior, an open upper end, a closed lower end and containing, in said hollow interior, a movable second tubular structure, and a weight sensor comprising means to directly sense the weight of said load;

said second tubular structure, being situated and adapted to axially slide in said open upper end of said first tubular structure is comprised of a hollow interior having a closed upper portion having an exterior surface adapted to contact said load, and a closed lower portion having an axial opening therein;

said weight sensor comprises a load cell and a piston wherein said load cell is situated in said closed lower end of said first tubular structure; and said piston is comprised of a head and a rod, wherein said head is retained within and adapted to axially slide in said hollow interior of said second tubular structure to thereby isolate said upper portion from said lower portion of said second tubular structure and said rod, which is adapted to contact said load cell, extends through and is adapted to slide in said axial opening in said lower portion of said second tubular structure.

2. A system for determining the weight of a load comprised of a frame consisting essentially of a load supporting segment and a load weighing segment, a device for converting analog signals to digital signals, and a terminal for computing, storing, and displaying data generated from said digital signals;

wherein said load weighing segment is mounted on said frame vertically below said load supporting segment also mounted on said frame and further;

wherein said load weighing segment is the apparatus of claim 1 and said weight sensor comprises means to generate an analog signal representative of said load.

3. An apparatus for weighing a load, said apparatus being comprised of a stationary tubular housing having a hollow interior, an open upper end, a closed lower end and containing, in said hollow interior, a cylinder, a load cell and a piston;

said cylinder is situated in said upper end of said stationary tubular housing and is comprised of a movable tubular housing adapted to axially slide in said upper end of said stationary tubular housing, said movable tubular housing having a hollow interior, a closed upper portion having an exterior surface adapted to contact said load and a closed lower portion having an axial opening therein, wherein said exterior surface of said closed upper portion of said movable tubular housing has an opening therein to form a passage to said hollow interior of said closed upper portion of said movable tubular housing;

said load cell is situated in said closed lower end of said stationary tubular housing; and said piston is comprised of a head and a rod, wherein said head is retained within and adapted to axially slide in said hollow interior of and to isolate said upper portion from said lower portion of said movable tubular housing and said rod, which is in contact with said load cell, extends through and is adapted to slide in said axial opening of said closed lower portion of said movable tubular housing.

4. An apparatus for weighing a load, said apparatus being comprised of a stationary tubular housing comprising a cylinder having a bottom attached thereto to thereby define a structure having a hollow interior, an open upper end and a closed lower end and containing, in said hollow interior, a movable tubular housing and a weight sensor;

said movable tubular housing is situated and adapted to axially slide in said upper end of said stationary tubular housing and is comprised of a hollow upper portion isolated from a hollow lower portion by a solid barrier situated between said upper portion and said lower portion;

said weight sensor is situated in said hollow upper portion of said movable tubular housing and comprises a load cell and a load contacting means; and said bottom of said stationary tubular housing contains a hole to thereby form a passage to said closed lower end of said stationary tubular housing and to said hollow lower portion of said movable tubular housing.

5. An apparatus for weighing a load, said apparatus being comprised of a stationary first tubular structure comprising a cylinder having a bottom attached thereto to thereby define a structure having a hollow interior, an open upper end, a closed lower end and containing, in said hollow interior, a movable second tubular structure, and a weight sensor;

said second tubular structure, being situated and adapted to axially slide in said open upper end of said first tubular structure, is comprised of a hollow interior having an upper portion and a lower portion, said upper portion and said lower portion being connected to a solid barrier situated between said upper portion and said lower portion to thereby isolate said upper portion from said lower portion, and wherein said upper portion of said second tubular structure is adapted to contact said load;

said weight sensor is situated in said upper portion of said second tubular structure and comprises means to directly sense the weight of said load; and said bottom of said first tubular structure contains a hole to thereby form a passage to said closed lower end of said first tubular structure and to said hollow lower portion of said second tubular structure.

6. The apparatus of claim 5 wherein said weight sensor comprises a load contacting means and a load cell.

7. A system for determining the weight of a load comprised of a frame consisting essentially of a load supporting segment and a load weighing segment, a device for converting analog signals to digital signals, and a terminal for computing, storing, and displaying data generated from said digital signals;

wherein said load weighing segment is mounted on said frame vertically below said load supporting segment also mounted on said frame and further;

wherein said load weighing segment is the apparatus of claim 6 and said weight sensor comprises means to generate an analog signal representative of said load.

8. The system of claim 7 wherein said frame, said device for converting analog signals to digital signals, and said terminal for computing, storing, and displaying data are mounted on a truck chassis.

9. The system of claim 8 wherein said frame has mounted thereon four of said load weighing apparatus.

10. The system of claim 9 wherein said frame is attached to said chassis by a pivot connection, whereby said frame is enabled to tilt around said pivot to facilitate placing and removing a load on said load supporting segment.

* * * * *